April 14, 1964 T. CAMPBELL 3,129,011
ROTARY SHAFT SEAL WITH DRAINAGE MEANS
Filed Dec. 10, 1962
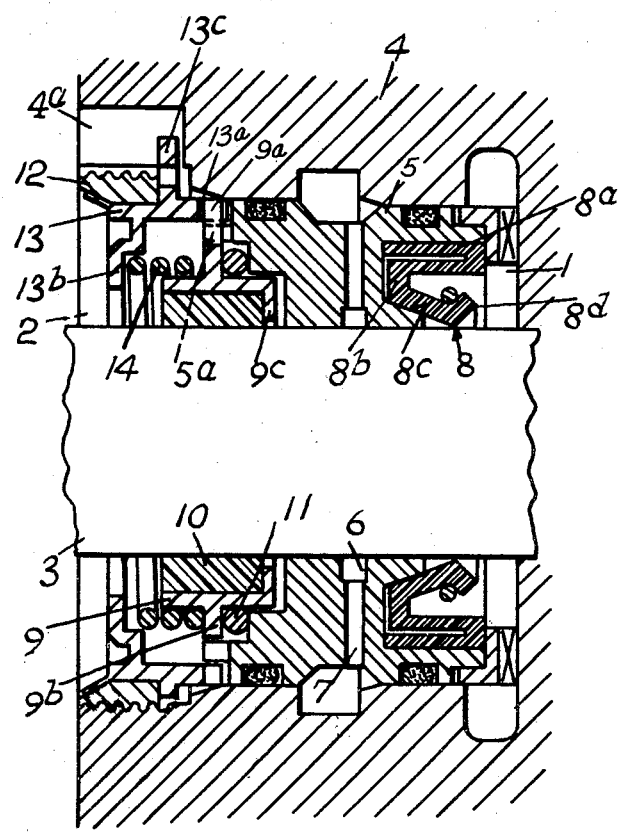

United States Patent Office 3,129,011
Patented Apr. 14, 1964

3,129,011
ROTARY SHAFT SEAL WITH DRAINAGE MEANS
Thomas Campbell, Knowle, England, assignor to Joseph Lucas (Industries) Limited, Birmingham, England
Filed Dec. 10, 1962, Ser. No. 243,340
2 Claims. (Cl. 277—59)

The object of this invention is to provide means in a convenient form for effecting a fluid seal around a rotary shaft.

Means according to the invention comprises a bearing bush mounted in a body part for the reception of the shaft, there being formed intermediate the ends of the bore in the bush a circumferentially extending groove which is in communication with a drain passage formed in the bush, a resilient annular sealing member located at one end of the bush and adapted to bear against the shaft, a rigid and annular carrier partially located within a recess in the other end of the bush, said carrier having a radially projecting tooth or the equivalent engaging with complementary parts of the bush whereby the carrier is permitted limited lateral movement relative to the bush but is prevented from relative angular movement about the axis of the bore, a second resilient annular sealing member carried by the carrier and adapted to bear against the shaft, and a spring acting on the carrier to urge it axially towards the bush.

An example of the invention is illustrated in sectional side elevation to the accompanying drawing.

In the illustrated example the sealing means is required for separating two compartments 1, 2 through which a rotary shaft 3 extends, it being important that two fluids such, for example, as a liquid, and air or other gas under pressure within the two compartments respectively, should not be allowed to mix.

In a bore in a body part 4 is a bush 5 having a cylindrical bore through which the shaft extends. Intermediate the ends of this bore in the bush there is formed a circumferentially extending groove 6 which is in communication with one or more radially disposed drain passages 7 formed in the bush.

At the end of the bush presented to the compartment 1 for containing the liquid is an annular recess within which is secured an annular rubber, plastic or other resilient sealing ring 8. The cross-section of the ring 8 is such that it has a cylindrical part 8a bearing against an internal surface of the bush which defines one side of the recess at this end, a radial part 8b bearing against the base of the recess, and a truncated conical part 8c bearing against the other side of the recess. The truncated conical part 8c protrudes from the recess towards the shaft, and is provided at its end with a right angular flange 8d, the annular apex between the conical part 8 and its flange 8d making line contact with the shaft 3.

At the opposite end of the bush is a stepped cylindrical recess having right angular annular shoulders between the parts of different diameters. The wall of the outer part of the recess, which is of greater diameter, is longitudinally notched at equi-angularly spaced positions to define the equivalent of an annular row of longitudinally extending teeth 5a at this end of the bush. Any two of these teeth engage with a radial tooth 9a on a radially extending flange 9b on a carrier 9 located partially within the recess, and serve to prevent angular movement of the carrier 9 relative to the bush 5 about the axis of the shaft, whilst permitting the carrier to move laterally to a limited extent relative to the bush to accommodate itself to any eccentricity in the shaft 3.

The main portion of the carrier 9 is of hollow cylindrical form having an inwardly directed flange 9c at one end. To the interior of this part is secured a hollow cylindrical sealing member 10 of rubber, plastic or other resilient material adapted to bear against the shaft. Moreover, between the flange 9b of the carrier and a shoulder of the recess is a rubber or other resilient sealing ring 11 of circular cross-section.

The bush is held against axial movement in the body part by means of a screw-threaded clamping ring 12 which also serves to hold in position a hollow cylindrical part 13 having at its inner end longitudinally extending teeth 13a which engage with the tooth 9a of the carrier at the outer side of the teeth 5a on the bush. Moreover, on the part 13 is an inwardly directed annular flange 13b which serves as an abutment for one end of a coiled compression spring 14 bearing on the carrier 9 and loading it against the sealing ring 11 on the shoulder on the bush. There is also provided a recess 4a in the body part into which a tongue 13c on the cylindrical part 13 fits in a manner to prevent angular rotation thereof when the ring 12 is tightened.

In operation fluid from either compartment managing to leak between the shaft 3 and the associated seal will find its way to the circumferential groove 6 in the bush from whence it can escape through the drain passages 7.

Having thus described my invention what I claim as new and desire to secure by Letters Patent is:

1. Means for effecting a fluid seal around a shaft rotatably supported within a bush mounted in a body and having a circumferential groove in its internal periphery, said means comprising in combination a resilient annular sealing member located at one end of the bush to bear on the shaft, a rigid and annular carrier member located at the other end of the bush, interengaging means on the bush and the carrier permitting lateral movement of the carrier member relative to the bush but preventing relative angular movement therebetween, a second resilient annular sealing member carried by said carrier and bearing on the shaft, a part fixed relative to the body, a spring acting between said part and the carrier to urge the carrier towards said bush and passage means in the bush connecting the groove to a drain.

2. Means for effecting a fluid seal around a shaft rotatably supported within a bush mounted in a body and having a circumferential groove in its internal periphery said means comprising in combination, a first resilient annular sealing member located at one end of the bush to bear on shaft, a rigid and annular carrier member located at the other end of the bush, a plurality of longitudinally extending angularly spaced teeth formed on said other end of the bush, a radially projecting peg on said carrier member, said peg being engageable by an adjacent pair of said teeth so as to permit lateral movement of the carrier member relative to the bush but to prevent relative angular movement, a second resilient annular sealing member carried by said carrier to bear on the shaft, a spring for urging the carrier towards said bush, an annular part against which the spring reacts, said annular part having longitudinal teeth engaging with the tooth on the carrier, a ring engaging the body to hold the part in position and passage means in the bush connecting the groove to a drain.

References Cited in the file of this patent
UNITED STATES PATENTS

| | | |
|---|---|---|
| 2,628,112 | Hebard | Feb. 10, 1953 |
| 3,011,808 | Tucker et al. | Dec. 5, 1961 |